United States Patent
Betros et al.

(10) Patent No.: US 7,509,319 B2
(45) Date of Patent: Mar. 24, 2009

(54) PROVIDING AUTHORIZED ACCESS AND REQUEST-INITIATED TRANSLATION OF DATA FILES

(75) Inventors: Kim Betros, Red Hook, NY (US); Ghassan Chidiac, Poughkeepsie, NY (US); Sanjay Gupta, Beacon, NY (US); Jeff Nordyke, Austin, TX (US); Giancarlo Palleschi, Highland, NY (US); Matthew Rosenthal, Hurley, NY (US); Evan E. Roubiecek, Tucson, AZ (US); Arnold O. Vimba, Ridgewood, NJ (US); Michael P. Zarnick, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 11/128,679

(22) Filed: May 13, 2005

(65) Prior Publication Data

US 2005/0273455 A1 Dec. 8, 2005

Related U.S. Application Data

(62) Division of application No. 09/730,224, filed on Dec. 5, 2000, now Pat. No. 7,062,486.

(51) Int. Cl.
*G06F 7/00* (2006.01)
*G06F 17/30* (2006.01)
(52) U.S. Cl. .................... 707/6; 707/9; 707/10
(58) Field of Classification Search .......... 707/6, 707/9, 10; 709/223–226; 726/2–4
See application file for complete search history.

(56) References Cited

U.S. PATENT DOCUMENTS

| 4,852,019 | A | * | 7/1989 | Vinberg et al. | 345/440 |
| 6,016,501 | A | | 1/2000 | Martin et al. | 707/203 |
| 6,035,307 | A | | 3/2000 | Martin et al. | 707/203 |
| 6,067,541 | A | * | 5/2000 | Raju et al. | 707/3 |
| 6,151,601 | A | * | 11/2000 | Papierniak et al. | 707/10 |

(Continued)

OTHER PUBLICATIONS

Tradanet (R); General Electric Global eXchange Services, [online]; [retrieved on Jan. 26, 2001]; retrieved from the Internet URL: http://www.gegxs.com/geiscom/template.jsp?page-1&id=11.

*Primary Examiner*—Pierre M Vital
*Assistant Examiner*—Christopher P Nofal
(74) *Attorney, Agent, or Firm*—Cantor Colburn LLP; Derek Jennings

(57) ABSTRACT

A method, system and computer program product for controlling access to data files stored in a repository is disclosed. The method includes receiving a request for a data file from a requester. The request specifies a data format preference for receiving the data file. The requested data format is different than either of a data format used to create the data file and a data format in which the data file is stored at the time of the request. The method also includes determining if the requester is authorized to access the requested data file and translating the requested data file from a stored data format into the requested data format responsive to receiving the request if the stored format differs from the requested format. The method further includes making the translated data file accessible to the requester if it is determined that the requester is authorized.

20 Claims, 12 Drawing Sheets

U.S. PATENT DOCUMENTS

| | | | |
|---|---|---|---|
| 6,247,135 B1 * | 6/2001 | Feague | 713/400 |
| 6,289,382 B1 * | 9/2001 | Bowman-Amuah | 709/226 |
| 6,321,337 B1 * | 11/2001 | Reshef et al. | 726/14 |
| 6,377,993 B1 * | 4/2002 | Brandt et al. | 709/227 |
| 6,381,618 B1 * | 4/2002 | Jones et al. | 707/203 |
| 6,434,568 B1 * | 8/2002 | Bowman-Amuah | 707/103 R |
| 6,453,353 B1 * | 9/2002 | Win et al. | 709/229 |
| 6,584,468 B1 * | 6/2003 | Gabriel et al. | 707/10 |
| 6,829,668 B2 * | 12/2004 | Keskar et al. | 710/305 |
| 7,062,486 B2 * | 6/2006 | Betros et al. | 707/6 |
| 2002/0069196 A1 * | 6/2002 | Betros et al. | 707/7 |
| 2002/0069227 A1 * | 6/2002 | Chidiac et al. | 707/523 |
| 2002/0087603 A1 * | 7/2002 | Bergman et al. | 707/517 |
| 2004/0148280 A1 * | 7/2004 | Chimura | 707/3 |
| 2005/0021533 A1 * | 1/2005 | Ayachitula et al. | 707/100 |
| 2005/0187963 A1 * | 8/2005 | Markin | 707/102 |

\* cited by examiner

*User File Format Preferences*

| 2D Format: | 3D Format: | Other Format: |
|---|---|---|
| ☐ 2D CADAM Model<br>☐ 2D DXF - Drafting Data<br>☒ 2D HPGL - Drafting Data<br>☐ 2D HPGL - Schematic Data<br>☐ 2D IGES - Drafting Data<br>☐ 2D PDF - Drafting Data<br>☒ 2D TIFF - Drafting Data<br>☐ 2D Viewport - Drafting Data<br>☐ CATIA Model(CATEXP)<br>☐ CorelDRAW Data<br>☐ CorelDRAW PDF Data<br>☐ DDLOGIC Data<br>☐ DDPHYSI Data<br>☐ ECNOTICE Text<br>☐ Gerber Data<br>☐ IGES Data<br>☐ IMAGE Data (IBM IOCA)<br>☐ Lotus WordPro Document<br>☐ MIF Data<br>☐ NCDRIL Data<br>☐ PKZIP (Compressed) Data<br>☐ PostScript Data<br>☐ TDIBOM Data<br>☐ TDITXT Data<br>☐ WordPro PDF Data | ☐ 3D DXF - Wireframe Geometry<br>☐ 3D IGES - Surface Geometry<br>☒ 3D IGES- Wireframe Geometry<br>☐ 3D Pro/E Part<br>☐ 3D STEP - Geometry Data<br>☐ CATIA Model (CATEXP)<br>☐ IGES Data | ☐ Nothing |

Fig. 5B

Electronic Graphic Interchange Request

Request Number: _____  IBM Site: _____

Submitted By: Matthew Rosenthal@IBM  IBM Contact Name: Amsterdam ▼ _____

| IBM Part Number | Engineering Change # | Formats Available | Status | Release Date | Basic Name |
|---|---|---|---|---|---|
| 0000037L0319 | 10000E73488X | ☐ 2D PDF - Drafting Data<br>☐ 2D DXF - Drafting Data<br>☑ 2D HPGL - Drafting Data<br>☐ 2D IGES - Drafting Data<br>☐ 2D Viewport - Drafting Data<br>☐ 3D DXF - Wireframe Geometry<br>☑ 3D IGES - Wireframe Geometry<br>☐ 3D Pro/E Part<br>☐ 3D STEP - Geometry Data<br>☐ CATIA Model(CATEXP)<br>☐ 3D IGES - Surface Geometry<br>☐ Bill of Materials | RD | 2000-06-15 | Bracket |

Fig. 5C

EGI Net

Home | Products | Consulting | Industries | News | About IBM

View existing requests

Download IBM Part# EC Num File Type Date Sent Date Downloaded Sent By

▲ 1: New Requests
▲ 2: Work in Progress
▲ 3: Ready for Download
▲ 4: Download Complete

View existing requests

| Download | IBM Part# | EC Num | File Type | | Date Sent | Date Downloaded | Sent By |
|---|---|---|---|---|---|---|---|
| ▼ 1: New Requests | | | | | | | |
| | 0000037L0319 | 10000E73488X | 2D HPGL | Drafting Data | | | |
| ▼ 2: Work in Progress | | | | | | | |
| | 00000011DP001 | 10000SYTST1M | 2D DXF - | Drafting Data | | | |
| ▼ 3: Ready for Download | | | | | | | |
| ☐ | 00000011DP003 | 10000SYTST2A | 2D HPGL - | Drafting Data | 09/14/2000 02:19:45 PM | | Eginet Support |
| ☐ | 00000011DP003 | 10000SYTST2A | 2DIGES - | Surface Geometry | 09/14/2000 02:20:25 PM | | Eginet Support |
| ▼ 4: Download Complete | | | | | | | |
| ☐ | 00000011DP003 | 10000SYTST2A | 2D DXF - | Drafting Data | 09/14/2000 02:19:48 PM | 09/14/2000 04:14:16 PM | Eginet Support |

Fig. 5D

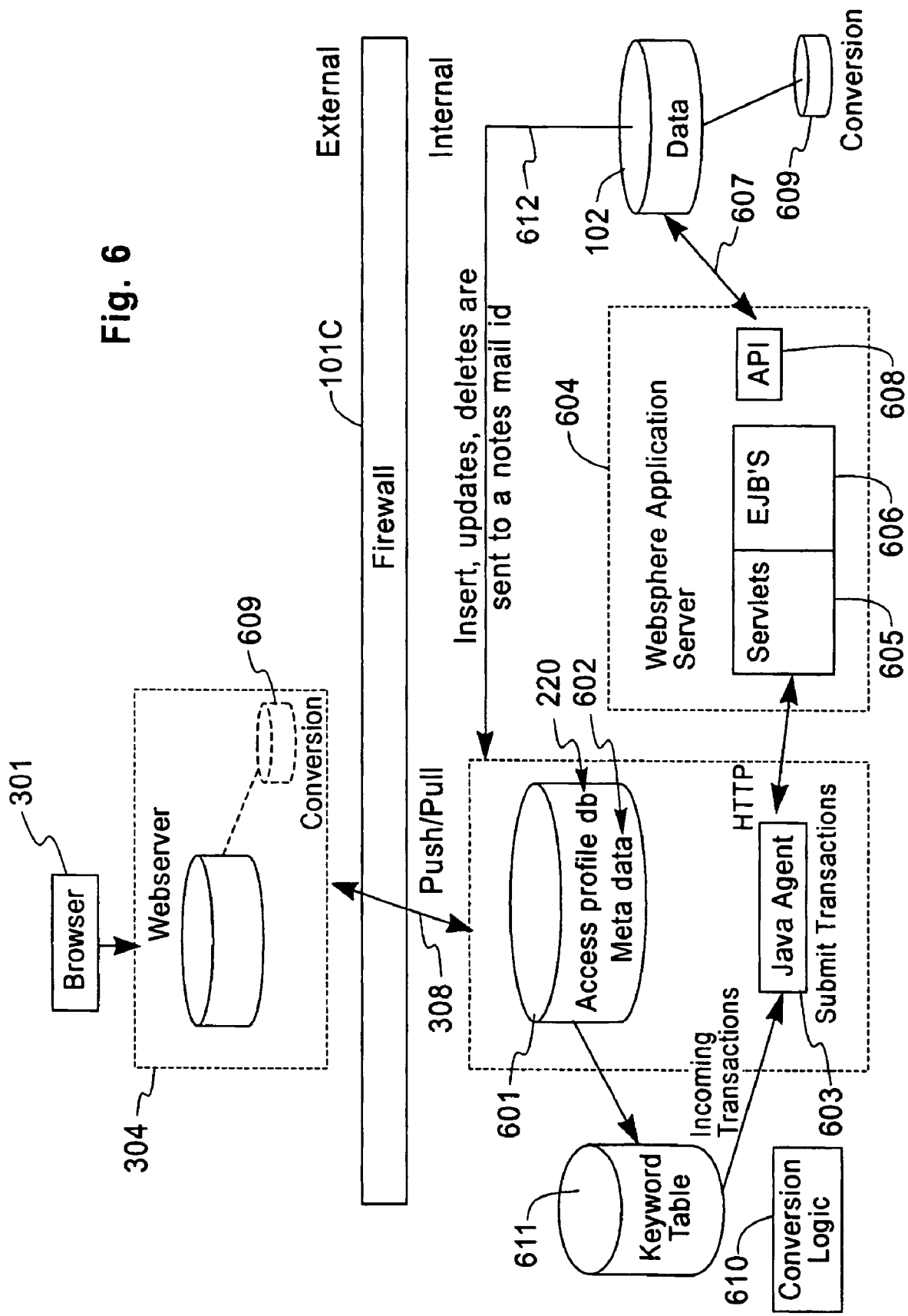

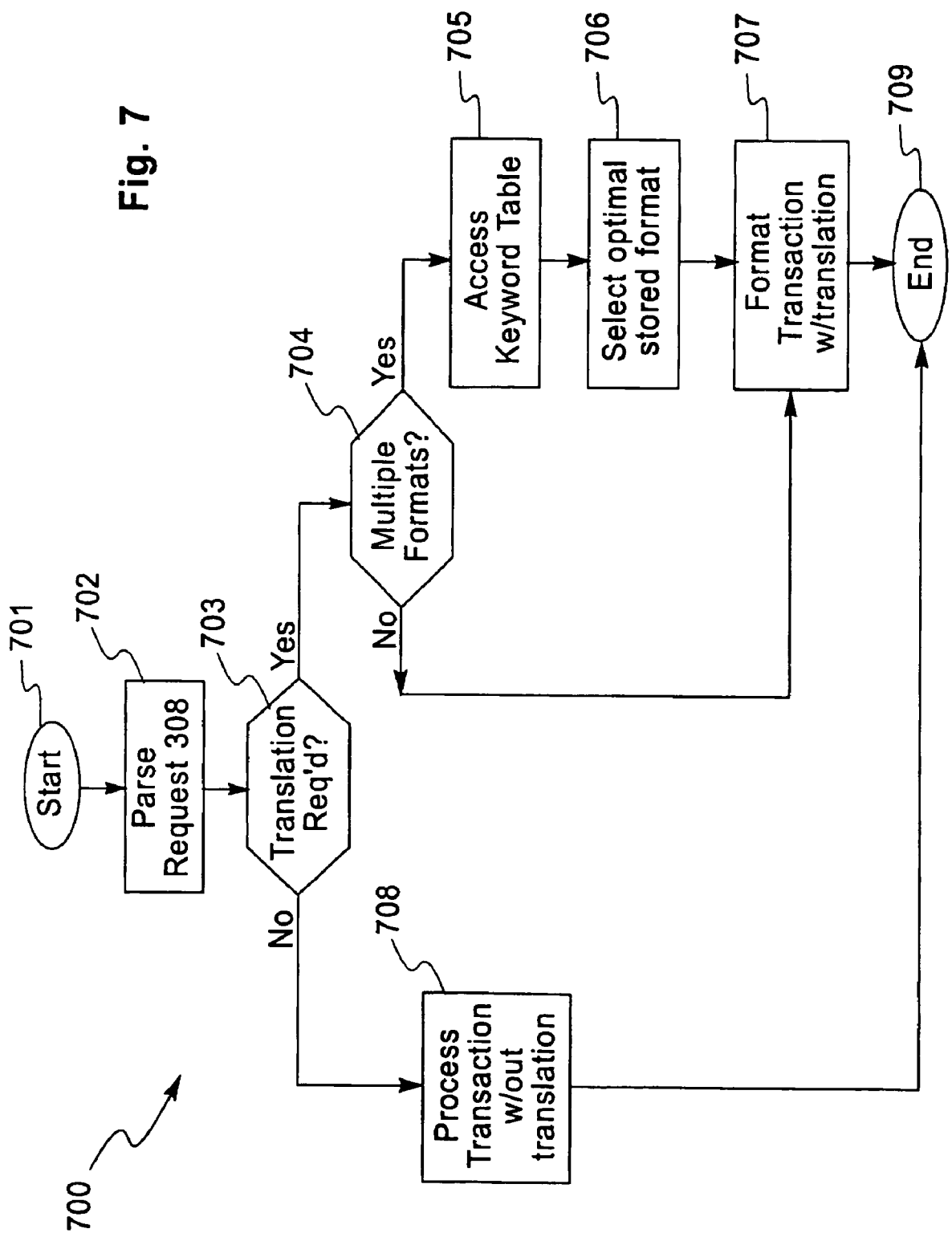

US 7,509,319 B2

PROVIDING AUTHORIZED ACCESS AND REQUEST-INITIATED TRANSLATION OF DATA FILES

CROSS REFERENCE TO RELATED APPLICATIONS

This application is a divisional of U.S. Ser. No. 09/730,224, filed Dec. 5, 2000, now U.S. Pat. No. 7,062,486 the contents of which is incorporated by reference herein in its entirety.

FIELD OF THE INVENTION

The present invention generally relates generally to the field of networked data processing and, more particularly, to the provision of a method, system and program product for enabling network access to a repository of formatted data files. The access is restricted to a set of authorized requesters and among the requesters, access is preferably further restricted based upon the characteristics of the stored data and on it's intended use by the requester. A requester may require access to the stored file in a format other than the format(s) in which it is stored. A request-initiated translation is provided to enable such access. The request-initiated translation may further be governed by a rules-based translation service which heuristically determines which of the stored file formats should be used as the basis for a translation to a requested file format.

BACKGROUND OF THE INVENTION

The advent of network-based e-commerce has had a dramatic impact on the way in which businesses interact with each other. The fact that business enterprises operating on different computing platforms, can leverage the platform independent power of the Internet to seamlessly interchange data with one another has created a new awareness of the competitive advantages that may secured by closely integrating the members of a commercial supply chain. A manufacturing entity, for example, can now share real-time data regarding its production operations with its raw material suppliers to enable a more efficient allocation of those raw materials, in turn decreasing inventory costs and ensuring that production by the manufacturer more closely reflects product demand. As a consequence, production cycles run more efficiently and dollar advantages garnered by the supply chain members should markedly increase. However, the mere existence of the Internet as a backbone for supporting the business-to-business interactions of the members of a supply chain is not itself sufficient for the full realization of such marketplace efficiencies.

While the Internet provides a readily available common backbone for inter-enterprise communication, the data processing environments within each enterprise may be markedly dissimilar, thus, merely enabling data flow between enterprises does not address fundamental processing system incompatibilities therebetween. In certain areas this issue is being addressed by adoption of standardized data description paradigms such as those found in the widely adopted extensible Markup Language (XML) which, along with the older Electronic Data Interchange (EDI) has established some standards for inter-enterprise data exchange. While EDI and XML may address many issues regarding inter-enterprise data communication, it is an inevitability that much of the data exchange required for an efficiently functioning supply chain, will involve data which is resident in legacy data processing systems in the various enterprises, and exists in formats that are incompatible with the processing systems of the various members of the supply chain. Moreover, it is a certainty that in most cases, these enterprises will not undertake the expensive, time-consuming and risk-laden task of converting their voluminous legacy data into the format of the currently accepted standard. Accordingly, it can be seen that there is a need to provide a seamless data format translation or transcoding scheme to further improve inter-enterprise data exchange.

Since it may often be the case that a requested data file exists within an enterprise in many different formats other than the requested format, a further advantageous aspect of the transcoding scheme would provide logic for selecting the optimal version of a requested data file from which to perform the translation.

A concomitant issue arising from the enhanced ability for inter-enterprise data communications relates to data security. Much of the data that is most important to the efficient operation of an enterprise is the same data for which inter-enterprise communication is necessary to enjoy the aforementioned market efficiencies. Thus, a tension exists between the desire to provide authorized supply chain partners with access to the data that they require to manage their portion of the supply chain, while at the same time ensuring that the data does not become available to unintended recipients such as competitors, customers, and other suppliers.

General Electric Global eXchange Services provides a service called Tradanet (R) (Tradanet is a registered trademark of General Electric Company, USA, headquartered in Gaithersburg, Md.) which offers some of these features. In particular, Tradanet offers the ability for an enterprise to transmit formatted documents via a secure Internet or other network connection to its authorized global trading partners. However the Tradanet service requires that the formats for such documents be pre-established at the enterprise and does not afford a mechanism whereby a partner may request a document in a format other than those pre-established by the enterprise. Hence, in the absence of a translation or transcoding feature, the Tradanet solution to fails to address the aforementioned compatibility issues and is, in essence, merely a secure document repository.

In view of the foregoing it can be seen that a solution is needed which addresses these security and compatibility issues so as to enable an enterprise to provide access to any and all data it deems valuable in promoting the efficient operation of its supply chain.

SUMMARY OF THE INVENTION

The foregoing problems and shortcoming of the prior art are overcome and further advantageous features are provided by the present invention wherein a method, an apparatus and a computer program product are provided for controlling access to a set of stored formatted data files and for enabling translation of the stored files from a stored format to another format. The method includes receiving a request for a data file from a requester. The request specifies a data format preference for receiving the data file. The requested data format is different than either of a data format used to create the data file and a data format in which the data file is stored at the time of the request. The method also includes determining if the requester is authorized to access the requested data file and translating the requested data file from a stored data format into the requested data format responsive to receiving the request if the stored format differs from the requested format.

The method further includes making the translated data file accessible to the requester if it is determined that the requester is authorized.

BRIEF DESCRIPTION OF THE DRAWINGS

The subject matter which is regarded as the invention is particularly pointed out and distinctly claimed at the conclusion of the specification. The foregoing and other beneficial features of the invention will be apparent from the following detailed description of a preferred implementation of the invention which is to be read in conjunction with the accompanying drawings wherein:

FIG. 5 comprising FIGS. 5a-5d depict screen shots that a supplier would see in interacting with the Web-based front end of the access control system;

FIG. 6 illustrates the structures and processes within the enterprise that enable a response to a supplier's request from the access control system for a data record in the enterprise repository;

FIG. 7 illustrates the process flow undertaken by the conversion logic for determining whether a file format translation is required and, if so, which stored file format should be used as input for the translation;

DETAILED DESCRIPTION OF THE PREFERRED EMBODIMENT OF THE INVENTION

The present invention will be described in terms of an implementation whereby computer-readable graphics files and related product design data which might include text files, spread sheets, and the like, all required for the design and manufacture of computer related equipment are made available to members of a value chain for an enterprise engaged in the manufacturing and design of computer systems. It will, however, be readily apparent to those skilled in the relevant art that this preferred embodiment of the invention is merely illustrative and it is readily contemplated that the unique features of the present invention may be put to myriad uses wherein it is desired to provide access to data in various formats to an authorized population of requesters of that data.

Figure 1:
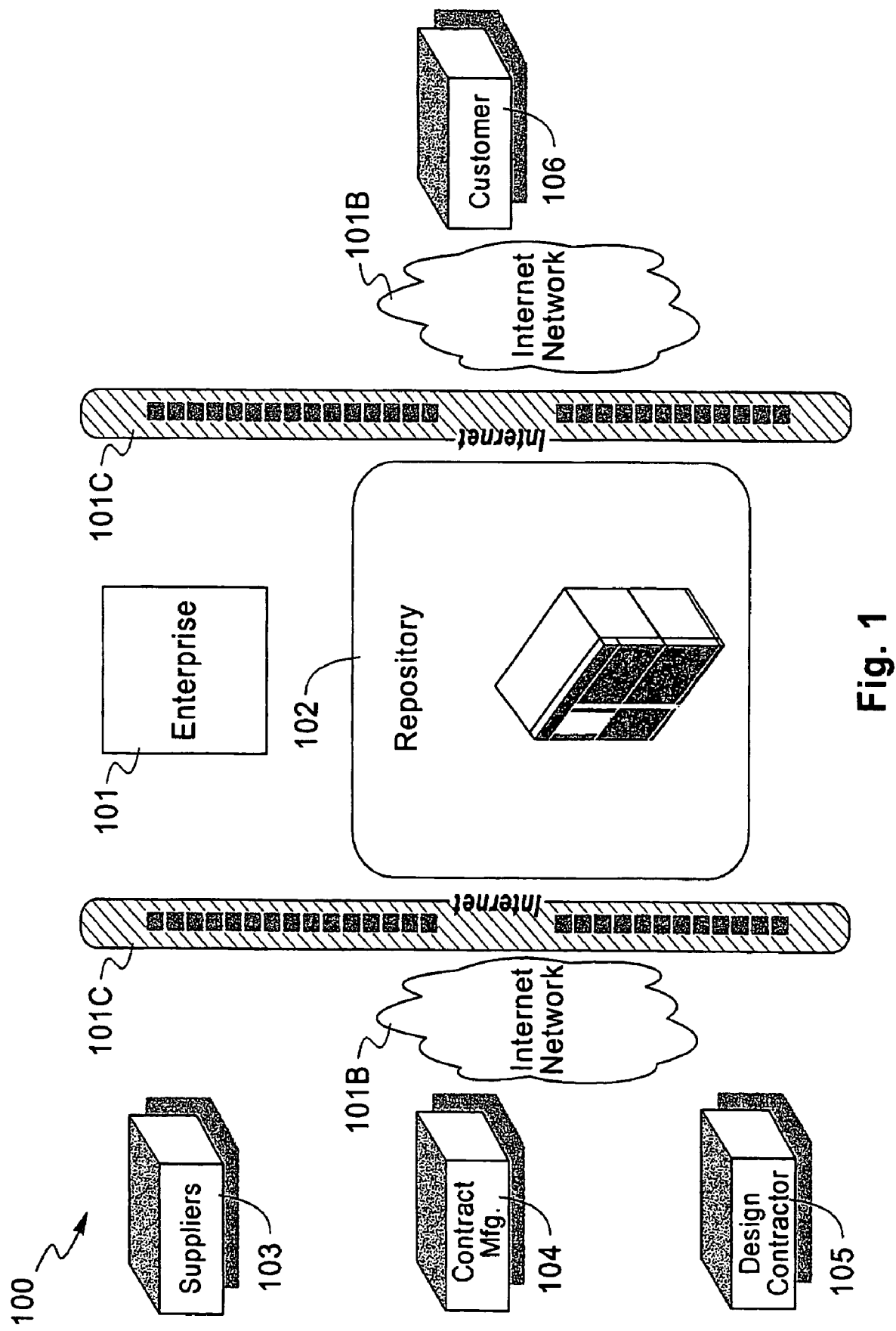
FIG. 1 depicts a typical manufacturing and design value chain environment wherein the present invention may be implemented.

Turning now to the invention in greater detail, reference may be had to FIG. 1 wherein is illustrated a representation of a manufacturing and design infrastructure value chain 100 wherein an embodiment of the present invention may be advantageously implemented. At the center of the infrastructure is an enterprise 101 which, in our example, is engaged in the design and manufacture of computer system. An example of such an enterprise is International Business Machines Corporation, the assignee of the present invention. Within the enterprise, a repository 102 houses information related to the design and manufacture of the computer systems. In a preferred embodiment, the information might take the form computer aided design (CAD) models representing two-dimensional (2D) and/or three dimensional (3D) renderings of elements utilized in the manufacture of a computer system, such elements might include, without limitation electronic components, mechanical hardware, enclosures, power supply, heat sinks, the repository may further include software files such as bit patterns representing the electrical configuration of programmable components. Additionally, it is contemplated that associated design and use data embodied in word processing documents, spread sheets and the like may be included as well as the CAD data.

The data repository 102 may be implemented as a centralized database such as a DB2(R) database (DB2 is a registered trademark of International Business Machines Corporation) or any other available database system or file system or simple as a set of flat files stored on server computers within the enterprise. Moreover, the repository may be implemented in a centralized or distributed fashion with elements of the repository residing on a single or on separate computer servers residing in different locations throughout the enterprise.

The enterprise 101 receives raw materials such as components and manufacturing resources as well as design resources, and provides finished products and occasional design data to customers. Accordingly, FIG. 1 further depicts the interaction among the various members of the value chain 100 for the creation, by the enterprise 101 of its computer systems. It is apparent via this depiction, which is a simplification of a typical manufacturing and design value chain, that the members of the chain would desire access to aspects of the data contained in the repository 102, related to their particular participation in the chain. Such access may be enabled by providing a network 101b for supporting the interaction between the enterprise and the other entities comprising the value chain (103-106) which in a preferred embodiment would take the form of an Internet connection or Extranet connection through the firewall 101c of the enterprise 101. FIG. 1 illustratively depicts the interaction between suppliers 103 and the enterprise 101 accessible to the members of the value chain through a Web browser interface. Suppliers, in a preferred embodiment connote those firms responsible for providing the enterprise with building blocks used in the manufacture of its computer systems. Such building blocks might, for example, be in the form of electronic components provided from a component supplier such as Intel Corporation for microprocessors or Amp Corporation for electrical connectors, or alternatively, in the form of mechanical hardware from a supplier such as North American Bolt and Screw Company, Inc. The enterprise 101 may additionally outsource its manufacturing requirements to a set of suppliers engaged in supplying services to the enterprise. Contract manufacturers 104 such as Solectron Corporation are an example. Moreover, the enterprise 101 may out-source details of the system design to an external design contractor 105. In certain instances, it may also be necessary for the enterprise to provide information regarding product design to a customer. Such a necessity may arise if the customer is providing, for example value, added reselling for the systems provided by the enterprise or for any of a variety of other reasons. The data in the repository may be entered by employees of enterprise 101 based upon technical information amassed by those employees alone or in conjunction with members of the value chain 100.

It is also noted that employees of the enterprise may wish to forward data from their personal computers to suppliers outside of the enterprise. To do so, these employees may make use of the security and translation facilities associated with the repository which will be subsequently addressed herein. In this manner, and by making use of the subsequently described techniques employed for securely transferring data from within the enterprise to external members of the value chain, information stored locally on an employee's computer may be passed to a supplier without first being stored in the repository, in a manner that ensures proper security and enables the translation of the file into the format desired by the receiving supplier.

Figure 2:
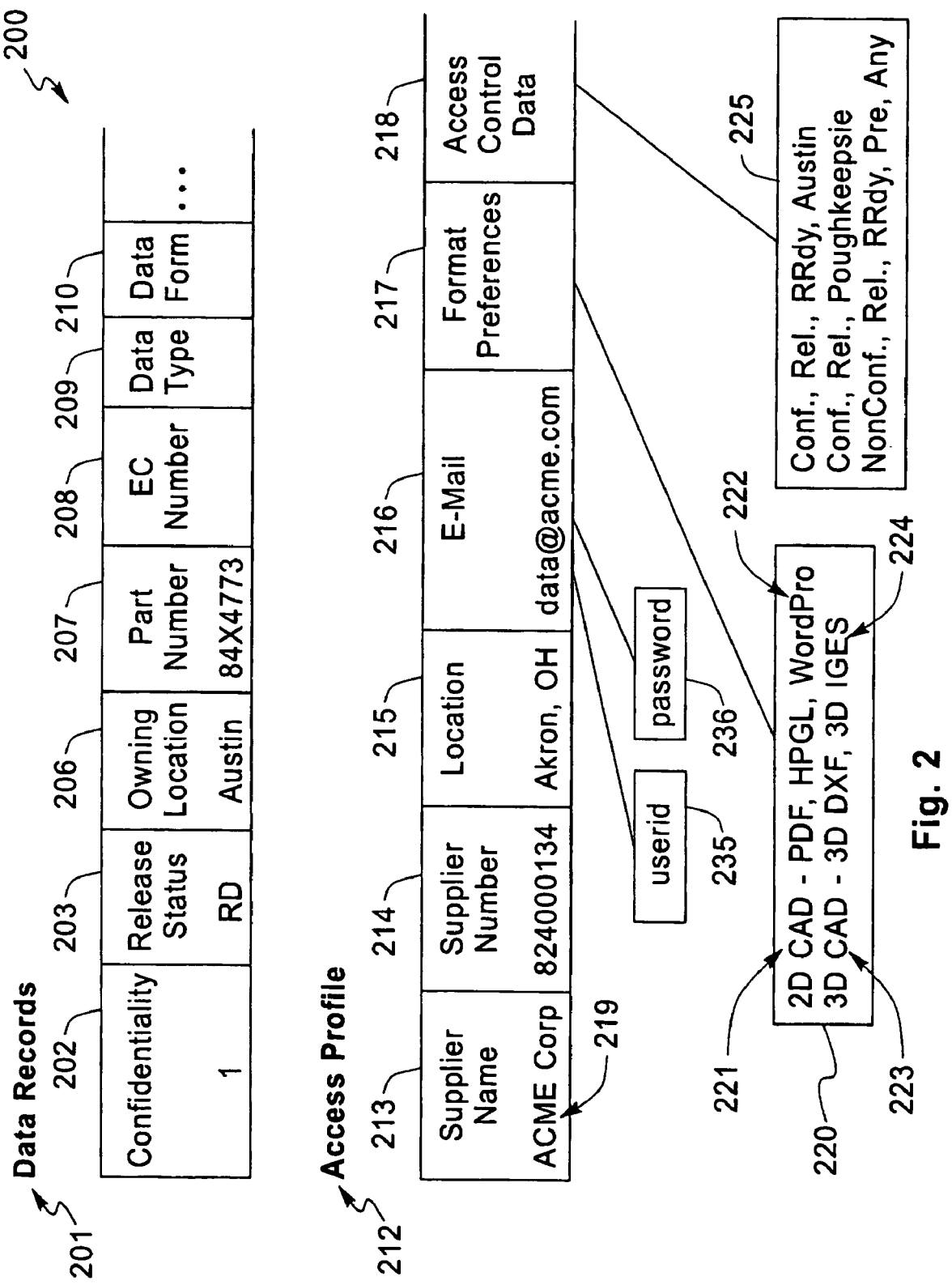
FIG. 2 illustrates an exemplary format for data storage in the enterprise repository.

From the foregoing explanation of the value chain it is apparent that the data stored in the repository 102, is central to the efficient functioning of the value chain 100. Each member of the chain has different access requirements depending on the data that relates to its role in the value chain 100. To further amplify this point, reference may be had to FIG. 2 wherein is illustrated an exemplary representation of the manufacturing and design data stored in repository 102. The repository 102 includes data records 201 which may be logically or physically partitioned in accordance with the nature of the components stored therein. For example, an individual data record 201 may include an indication as to whether the record is to be treated as confidential 202, whether the information in the record is at released status 203 (i.e., in a final unalterable state), in a release ready state (wherein the data is presumed final and awaiting approval for promotion to released state), or a pre-released state wherein it is likely that the data will change. The location within the enterprise controlling the data for the record can also be listed 206. In our example record 201 is listed as a confidential, release ready data record which is owned the Austin, Tex. branch of enterprise 101. Each of these levels of classification assist in the creation of an access control system 300 as is subsequently described herein.

Other data that may also be stored regarding the data file 201 include the part number 207 and the engineering change (EC) number 208 of the document (a designation used for tracking the progress of the constituent part number(s) that are the subject of the data file). Additionally, information regarding the data type (DTYPE) 209, and data format (DFORM) 210 of the record may be stored. The data type 209 of a record indicates the native environment in which the data record was created. For example, a word processing file create in Lotus WORD PRO would have a designation of WORD PRO as its data type, while a CAD document created in CATIA would have a data type of CATIA. The data format field 210 indicates the format in which the data record 201 is currently stored in the repository. Referring to our WORD PRO example, it may be desirable, owing to its universal popularity, to save a copy of the Word Pro file in PDF format, in which case the data format field for the record would indicate PDF. A version of the WORD PRO file which was stored in WORD PRO format would indicate this by listing either WORD PRO or SRC (source) as its data format. CAD drawing, as is known to those skilled in the art, comprises elements which are used to create renderings of increasing complexity. A rudimentary CAD element in a solid modeling system might be a CUBIOD which could be combined with other elements into an ASSEMBLY, which in turn may be stored as a WIRE (faceted) rendering or a SOLID rendering which can be shaded and/or rotated for visualization purposes. A CAD drawing with data type CATIA might then have a data format of WIRE or SOLID, etc. depending upon the stored format of the data record. The foregoing CAD DFORMs are exemplary, other such formats are well known to those skilled in the art and are contemplated to be included in the data format field as well.

In addition to information specific to stored data records 201, the enterprise preferably stores information regarding the members of value chain 100 with authority to access the data records in the repository in an access profile database 212, which may be implemented in the same or different data space than the data records 201. The access profile database 212 is instrumental in controlling whether requesting suppliers and other members of the value chain 100 will be granted permission to access the repository 102, and if so, it serves to control which data records 201 within the repository 102 they are authorized to receive and in what format they wish to receive them.

Referring in detail to the access profile database 212, it can be seen that the database includes a listing of each value chain member that has been granted access to the repository 102. Access to the repository 102 is enabled through a registration process wherein a supplier 103 or other value chain member applies for and is granted authority to access certain designated data records 201 in the repository 102. For ease of explanation we shall refer, by way of example, to the designation of access control for a supplier 103 in value chain 100, however, it is to be understood that any member of the value chain 100 would be handled in a substantially identical manner.

Each supplier is listed in the database 212 by supplier name 213, as well as by a designated supplier number 214. The location of the supplier is listed 215 as well as the e-mail address(es) 216 for contacts at the supplier and a userid (s) 235 and password(s) 236 to enable a user to log in to the system. Moreover, a listing of the supplier's data format preferences 217 is maintained in the database 212. Format preferences may include a variety of information regarding the format(s) in which the supplier 103 wishes to access the data record 201. Next, access control data is listed 218 which as will be shown, include a level of detail regarding the types of records 201 that may be accessed by the supplier. In a preferred embodiment, the data record attributes for determining access include the confidential status of the record 202, the release status 203-205 and the location owning the data record 206.

Entry 219 illustrates the database 212 record for a given supplier Acme Corp., an electronic assembly supplier located in Akron, Ohio 215. As can be seen the supplier name 213 entry lists Acme Corp., the supplier number 214 is designated as 86.times.1241. The supplier's e-mail address is data@acme.com 216, and the format preferences 217 are presented in a exploded fashion in box 220. The suppliers access control data 218 is listed in an exploded fashion in box 221.

As is seen via an examination of box 220, Acme has indicated certain data format preferences for certain types of data. That is, upon registering, Acme has provided it's preferred formats in which to receive certain types of information. The data format preference refers to the particular encoding that the data has/will undergo prior to provision to the supplier. This data format preference 220 will be relevant in permitting the enterprise 101 to assess whether a requested record 201 is available in a preferred format and, if not, whether a translation to a preferred format may be undertaken, and, if so, which stored format for the record should be used to best accomplish the translation. These features of the present invention will be subsequently addressed in detail herein. Box 220 illustrates Acme's data format preferences. Here we see that Acme has indicated it's preferences to receive 2D CAD data 221 in PDF format or HPGL format which ever is available as well as Word Pro format 222 depending upon availability. 3D files 223 are preferred in either 3D D.times.F Wireframe geometry format or 3dIGES surface geometry formats 224. This is list merely illustrative and it is contemplated that other formats could be included. Moreover, other formatting features may be offered, for example, and as will be detailed subsequently, the supplier may indicate a particular preference associated with a specific request for a data record 201 which conflicts with the supplier's stored preference 220, the system permits this specifically requested format to override the supplier's stored format preferences 220, this override might be useful in any number of circumstances, for example when a supplier seeks to access the data in the repository via a mobile networked device such as a cellular telephone or PDA wherein the data format preference of the requesting supplier is likely to be dictated by bandwidth and device display limitations.

As can be seen via an examination of box 225, Acme, is granted authority to access confidential files which are at released or release-ready status level and which are owned by the Austin, Tex. location of the enterprise 101, and from the Poughkeepsie, N.Y. location if they are at released status. Further, it can be seen that the supplier has authority to access all non-confidential files in any release status from any location. The functionality of this stored data will be further described below in conjunction with the use of the access control system 300.

Figure 3:
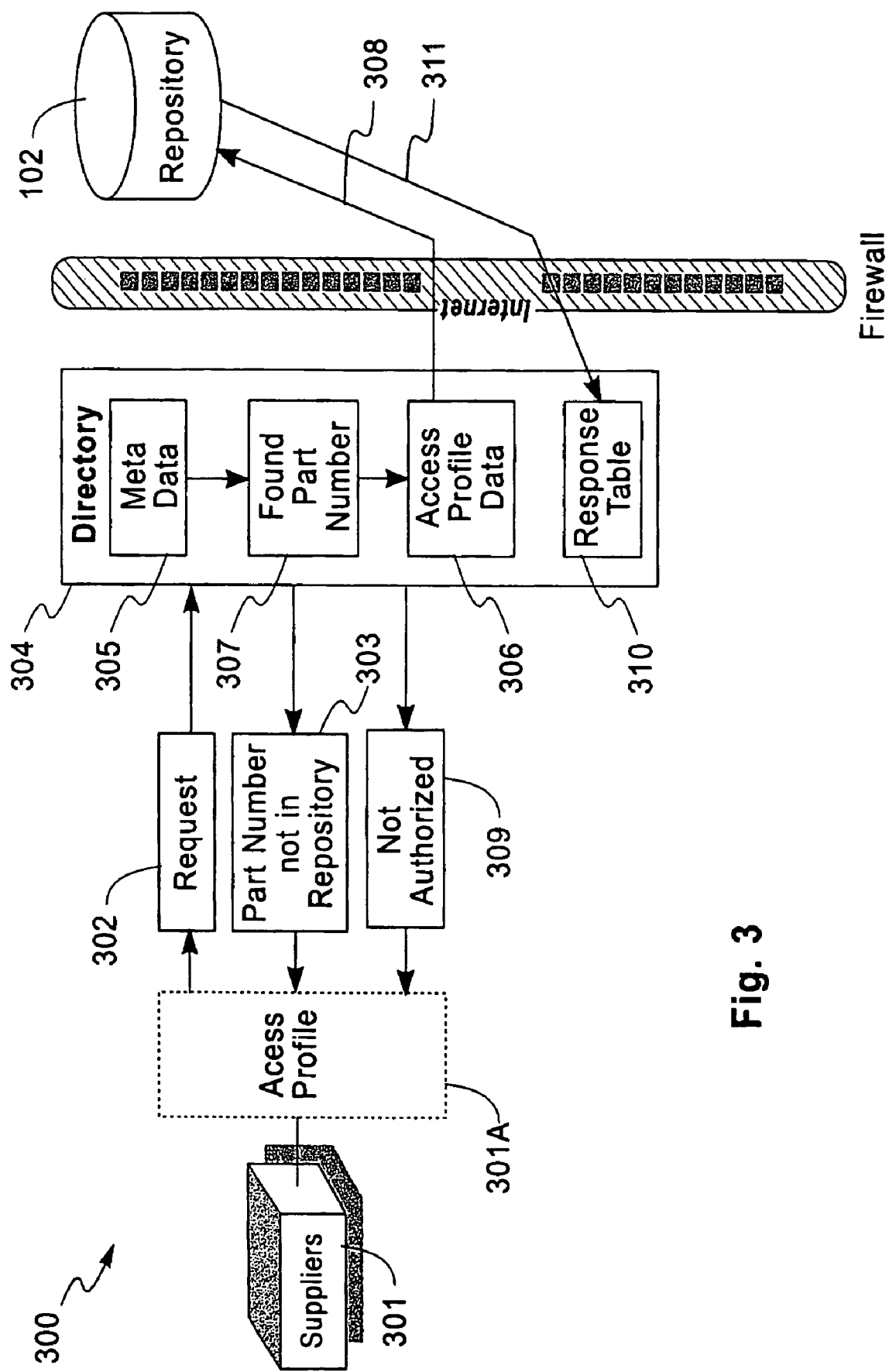
FIG. 3 depicts an access control system for restricting access to the data in the repository to authorized suppliers.

FIG. 3 depicts an access control system 300 for managing access to data in the repository 102 by the members of the value chain 100. By way of example, FIG. 3 depicts a supplier 301. As described above, this supplier has an access profile entry 225 in the access profile database 212 associated with it, which is illustrated via the dashed lined drawing as 301a. This profile is maintained in database 212 and is established upon the supplier's registration to the value chain network 101b. The entry may be subsequently updated and/or deleted by the enterprise 101 upon request by the supplier 301. The profile is integrated into the access control system 300 to ensure that the supplier 301 is granted the proper level of authority to access designated data record types in repository 102 and to facilitate data transmission in accordance with the supplier's format preferences.

In a preferred embodiment of the invention an overview of the access control system 300 is as follows: Supplier's 301 access to the repository is enabled by way of a directory 304 which consists of meta-data 305 representative of the data in the repository 102, as well as a replica 306 of the supplier access profile database 212. The directory 304 is kept in up to date with changes to the repository 102 in a manner that will be subsequently detailed herein. Each supplier 301 may generate requests 302 for information from the repository 102 over the network 101B. The directory 304 receives these requests and determines whether the requested data is resident in the repository. If not, the directory responds to the supplier with an indication that the requested data does not exist in the repository 303. If the supplier requests data existing in the repository 307, the directory 304 executes an access control function, determining whether the request should be completed based upon the supplier's access profile data 306. If the supplier requests information which, based upon its profile, it is entitled to receive, the directory forwards the request to repository 308 and the data is thereafter provided to the supplier. Alternatively, if the supplier requests information that conflicts with the access privileges established in the suppliers profile as seen in 306, the directory will reject the access request 309. Responses to successful requests 311 are subsequently retrieved from the repository 102 and made available to the supplier 301 in response table 310. Responses may be maintained in table 310 for a predetermined time period even after successful download by the requesting supplier 301 to accommodate subsequent authorized requests for the same part number by the same or by other authorized suppliers.

As previously noted, the repository 102 is mirrored outside the enterprise's Internet firewall 101c in the form of a directory 304, which includes a meta-data representation 305 of the data records stored in repository 102. In a preferred embodiment, the directory 304 is maintained as a Lotus Notes database on a Lotus Domino server belonging to enterprise 101 (Lotus and Notes are registered trademarks and Domino is a trademark of International Business Machines Corporation). The directory 304 serves as a filter for access requests 302 from the suppliers, determining which requests will be rejected and which will be forwarded to the repository 102.

Figure 4:
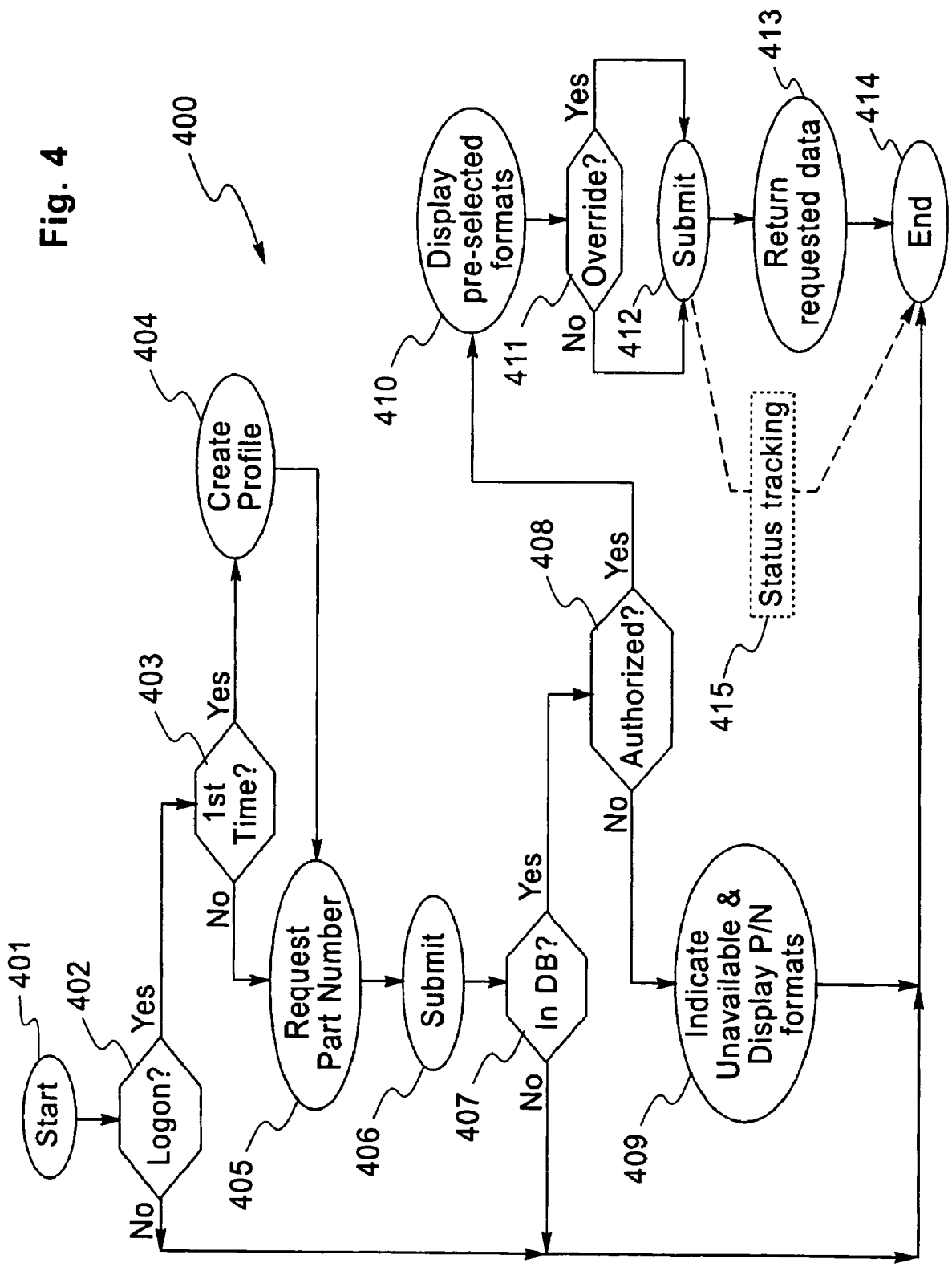
FIG. 4 illustrates the process flow undertaken when a supplier submits a request for a data record in the repository through the access control system.
Figure 5A:
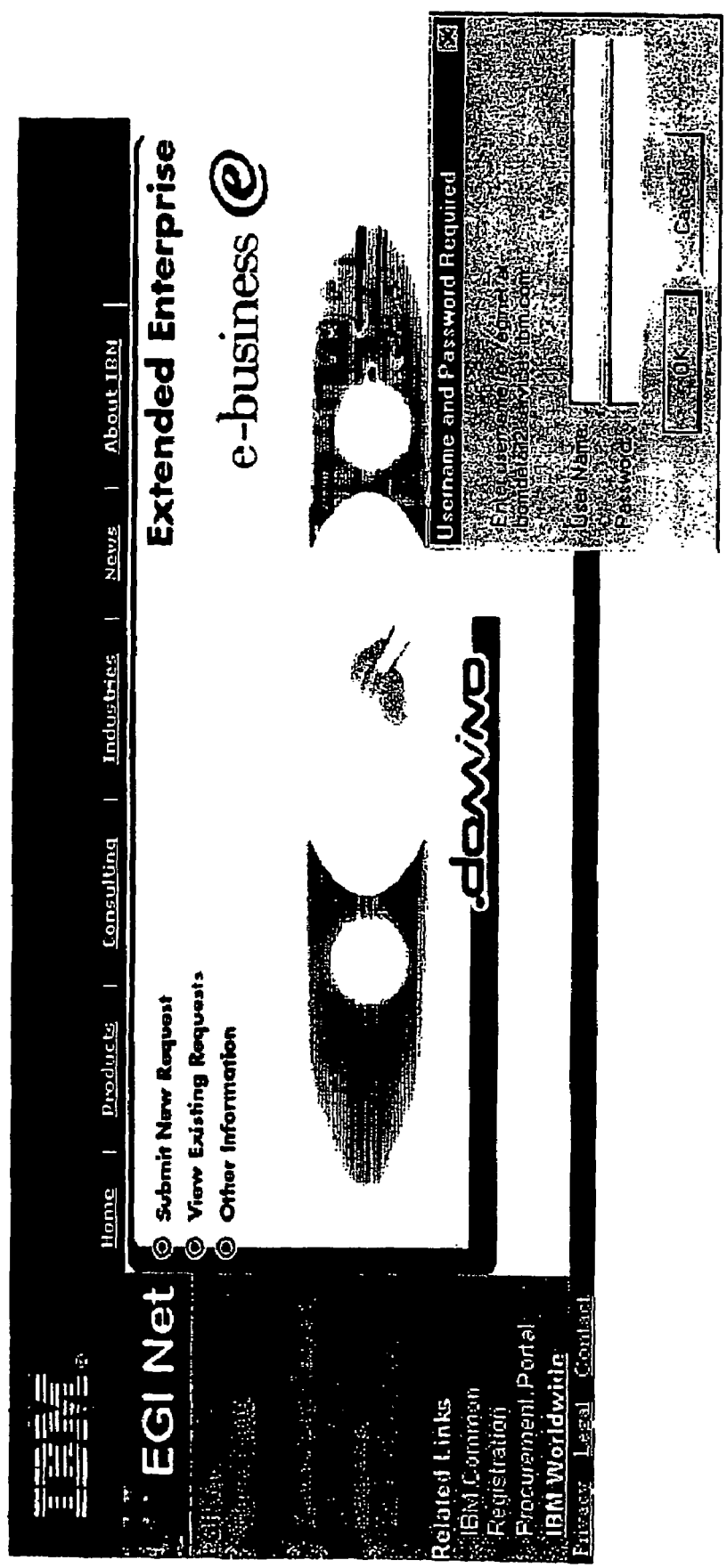

It will be illustrative to analyze the steps undertaken in transmitting a request for a data record using the access control system 300. FIG. 4 depicts a flow diagram 400 for the process of transmitting a request from supplier 301 for a data record 201 in repository 102 via access control system 300. Starting at step 401 the supplier accesses the software for submitting a request which is preferably implemented as a Web-based application, and is prompted to log onto the system by providing a userid and password 402. This is shown for example in the user logon screen in FIG. 5a. It will be recalled that the supplier's userid 235 and password data 236 are stored in the access control database 212 and mirrored in the copy 306 in the directory 304. The userid and password entered by the supplier 402 are compared against the access profile database 306 and if a match is found the process 400 continues, while if no match is found the supplier is not authorized to access the repository and the process ends 414. Upon successful log on, it is determined whether this is the first time a supplier has logged onto the system 403, if so, the supplier may be given the option of creating their format preference portion of their profile 404 (as shown in FIG. 5b) if not, or after creating the preference profile the supplier will create a request for information on a data record 405 by entering the part number 207 and EC number 208 for the part. The supplier submits the request 406 and the request is routed to the meta data table 305 in directory 304 to determine whether the requested part number and EC exist in the repository 407. If the requested part number and EC do not exist there is no data available on the requested record and the process is ended 414. If the part number and EC are located in the meta data 305 the process continues to step 408 wherein the details for the requested data record as identified in the meta data 305 in step 407 are compared with the suppliers access profile information 306 as identified upon logging into the system 402, to determine if the supplier is authorized to receive information on the requested data record. Thus, a determination is made in step 408 as to whether the data record matches the access control information described as part of table 225 of the database 212 and mirrored in the access profile database 306. If the supplier is not authorized to retrieve this data file the system 300 will indicate that this record is not available for retrieval by the supplier 409 thereby ending the process 414. Alternatively, if the supplier is authorized 408 the system 300 displays the retrieved information from the meta data 305 including the part number, EC and list of available formats with the preferred data formats for the supplier preselected 410 (see FIG. 5c). As can be seen in 5C the supplier is given the option of selecting formats other then those preselected by the system 300 based upon the suppliers data format preferences located in the access profile data base 306. Irrespective of whether the supplier overrides its preferred formats 411, the process next requires that the supplier submit this request 412, at which point the request will pass through the directory 304 and the firewall 101c to the repository 102 where it is handled in a manner that will be subsequently described. Thereafter the repository returns the information 413 requested by the supplier through the directory 304 in response table 310 for access by the supplier thereby ending the process 414. The status of a request once submitted at step 412 is tracked 415 through its completion as is shown in FIG. 5D which displays new requests, work in progress, files available for download and files which have previously been downloaded which are maintained on the directory for a predetermined time after the download in case the supplier needs to access the record again (for example if the supplier inadvertently deletes the downloaded record).

Having examined the process undertaken by a supplier for the submission and fulfillment of a request, it will now be instructive to consider how the enterprise 101 manages its response to a request from the supplier. Turning to FIG. 6 we can see that a request 308 from supplier 301 is sent through the firewall 101C into the enterprise 101. From the directory 304 it can be seen that the request 308 is forwarded to a Notes repository 601 which is comprised of the access profile database 220 and the original copy 602 of the parts meta-data 305 which is derived from the parts repository 102. In operation, the directory 304 has meta data 305 and access profile databases 306 which are replicated from the Notes database 601 via its constituent tables 220 and 602 respectively. At this point the supplier 301 when accessing the directory 304 would be informed FIG. 5d via status tracking 415 that his request is being processed.

The request 308 passes through 601 to a conversion processing logic 610 which includes a keyword prioritization table 611. The conversion logic element 610 functions to determine whether the requested format will necessitate a translation from a file format stored in the repository 102 and further to determine which of such stored formats should be used for the translation.

FIG. 7 illustrates the process flow 700 implemented by the conversion logic 610. Starting at step 701 the request coming through the database 601 is parsed 702 and the requested part number, requesting supplier, format requested (DFORM, DTYPE) as well as the results of the matching of the part number against the meta data table 602, in particular the formats in which the requested part number are stored in the repository 102 are accessed. The flow continues to step 703 wherein it is determined whether a translation is required. A translation will be required where a supplier requests a format other than those stored in the repository 102 for the requested part number. If no translation is required no further processing for the conversion logic 610 is required and process continues to step 708 wherein a transaction indicating a request for the requested part number in the requested stored format is passed forward and the conversion process 700 is ended 709.

Alternatively, if the requested format is not stored in repository 102, the flow passes to step 704 wherein it is determined whether the requested part is stored in multiple formats. If the part is stored in only one format then that format will be the format used as the starting point for the translation of the part number file to the requested format. The transaction for such a request is created in step 707. Alternatively, if the requested part number file is stored in multiple formats 704, processing continues to step 705 wherein the keyword table 611 is accessed.

Figure 8:
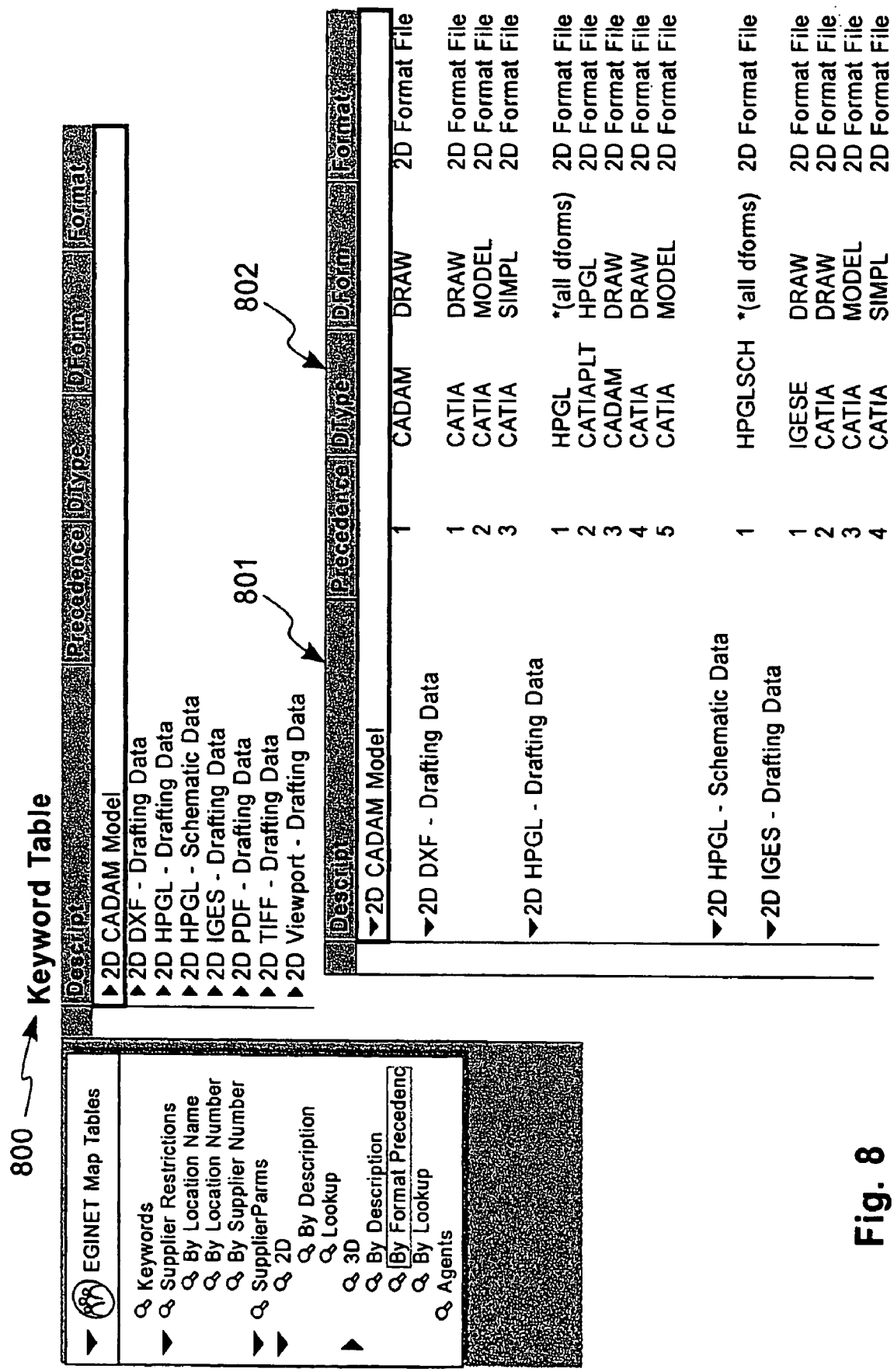
FIG. 8 depicts an illustrative structure for the keyword table used in conjunction with the conversion logic to enable file format translation.

The keyword table is shown in FIG. 8. In essence, the keyword table presents a two level list, the first level showing potentially requested formats 801 and each item in the first list is related to a second level list 802 which is a prioritized list of formats, each of which might be used as a starting point for performing the required format translations to the request format 801. The organization of the second level prioritized list is preferably based upon the level of information required for the request file format 801, and the list proceeds in decreasing order listing first the file formats having at least as much or more data than the request format and continuing forwarding in decreasing order of data content. In an alternative implementation the listing order may be based upon other criteria such as minimizing the amount of processing required for a translation to the requested format. In still a further refinement it is contemplated that multiple versions of the keyword table might be utilized, each comprising a second level list that is prioritized based upon a different criteria. Responsive to a requester provided indication of translation criteria such as preservation of data, the appropriate keyword table version, with a second level list prioritized in accordance with the requester's preference, would be used to determine the appropriate stored file format to be used as a starting point for the translation.

Following the process 700, the keyword table 611 is accessed and the requested format is accessed in the first level list. Thereafter the second level list is accessed compared against the results of the meta data 602 portion of the parsed request (indicating the formats of the stored part number file) and the highest priority listed format which is stored in the repository is chosen 706. Thereafter the transaction requesting translation to the chosen format is created 707 and the process is ended 709.

After processing via the conversion logic 610 and the request for the part number file and translation (if needed) are passed through a secure agent 603 which in a preferred embodiment is a Java program which functions to securely transfer the processed request 308 via HTTP to the Application server 604 which in this case is a Websphere Application server. This request includes the part number, the requested file format, and if a translation is required, it will also include the format which should be used as the basis for the translation.

The application server 604 builds a transaction request 607 which will be processed by the repository 102 to generate a properly formatted response containing the requested part number data.

In a preferred embodiment the repository is a DB2(R) database running on an MVS operating system. The server 604 includes Java servlets 605 and Enterprise Java Beans 606 which instantiate the transaction request 607 to be submitted via an application program interface API 608 to the repository 102. The server 604, in a preferred embodiment, builds the required set of messages into the API 608 for transmission 607 to the repository 102 so as to interface with the MVS-based database 102 to extract the requested information therefrom.

The API 608 provides the interface between the server 604 and the repository 102. The repository receives the request from the server 604 and extracts the requested part number file in the appropriate format. If the supplier 301 requests a part number file in a previously stored format, then no translation will be required, and the file as extracted from the repository is forwarded to the database 601 where from it is replicated to the directory database 304 and made available to the requesting supplier 301 upon subsequent successful logon thereto. Alternatively, if the supplier requests a part number file in a format not previously stored, the conversion logic 610 will have previously designated a format from which to perform a translation to the request file format.

The request 608 will prompt the repository 102 to extract this designated part number file in the determined format and pass it to the conversion engine 609 for translation into the requested format. The repository interprets the messages sent from the server 604 which instructs the extraction of the required part number file in the appropriate format, and which directs the file to be translated, if necessary, by the conversion engine 609 into the requested format.

The conversion engine 609 includes software for translating the request files from stored format to the requested formats. Such software is well known to those skilled in the art and as such will not be covered in detail herein. It is sufficient to note that the tools required to perform a translation from a given file format to another file format are readily incorporated into the conversion engine 609 and that the conversion engine functions to provide output in a format requested by the supplier 301 when such a requested format is not previously available in the repository 102.

In a further preferred embodiment a conversion engine 609 might be alternatively or additionally implemented in the external access control system's directory 304. In such an embodiment the translation of the requested data file might initially take place in the directory 304 after the selected starting file format is extracted from the repository as described above. Moreover, once provided to the directory 304, the translated data file may be retained thereat for a predetermined time period and further translated based upon subsequent authorized requests for the data file in different file formats. In such an embodiment, the number of accesses via requests to the enterprise may be minimized at the expense of processing overhead in the directory 304 and the limitation that a translation operation based upon a given request for a data file retained at the directory 304 will likely have only one stored format in the directory 304 upon which to base the translation.

The result of the transaction which extracts the part number file from the repository 102 and optionally performs the conversion 609 is a properly formatted part number file 612 responsive to a supplier's 301 request. The output 612 is forwarded to database 601 whereat the part number and format are matched with authorized requests received at the database 601 for the part number file in the format of output 612. The output is thereafter transmitted through firewall 101c outside of the enterprise 101 to the directory database 304 at table 310 and made available to the requesting supplier 301. The supplier by logging in 402 will be presented with an indication (FIG. 5d) via the status tracking feature 415 of the access control system, that the requested part number file is now available for download from the directory database 304.

It is possible that the request part number may be requested in the format of the output 612 contemporaneously by multiple suppliers. This is especially true when a part number has undergone a recent engineering change which affects multiple suppliers. The likelihood in such situations is that the part number file will be requested by multiple suppliers over a span of days and/or weeks surrounding the change. Accordingly, and as previously described, once a file is transmitted to the response table 310 for the directory database 304 it may be cached thereat for a predetermined time period so that subsequent requests to access the part number file may be handled completely out of the directory database 304 without requiring access to the repository 102. As with any caching operation, the files maintained that are provided to the repository with an expiration date 310a after which the data will be considered unreliable (i.e., it has become stale) and the files are thereafter purged. Moreover, and as previously described, the presence of optional conversion engine 609 at the directory 304 enables the conversion from a cached file format to a different subsequently requested format without requiring reference to the repository 102.

Figure 9:
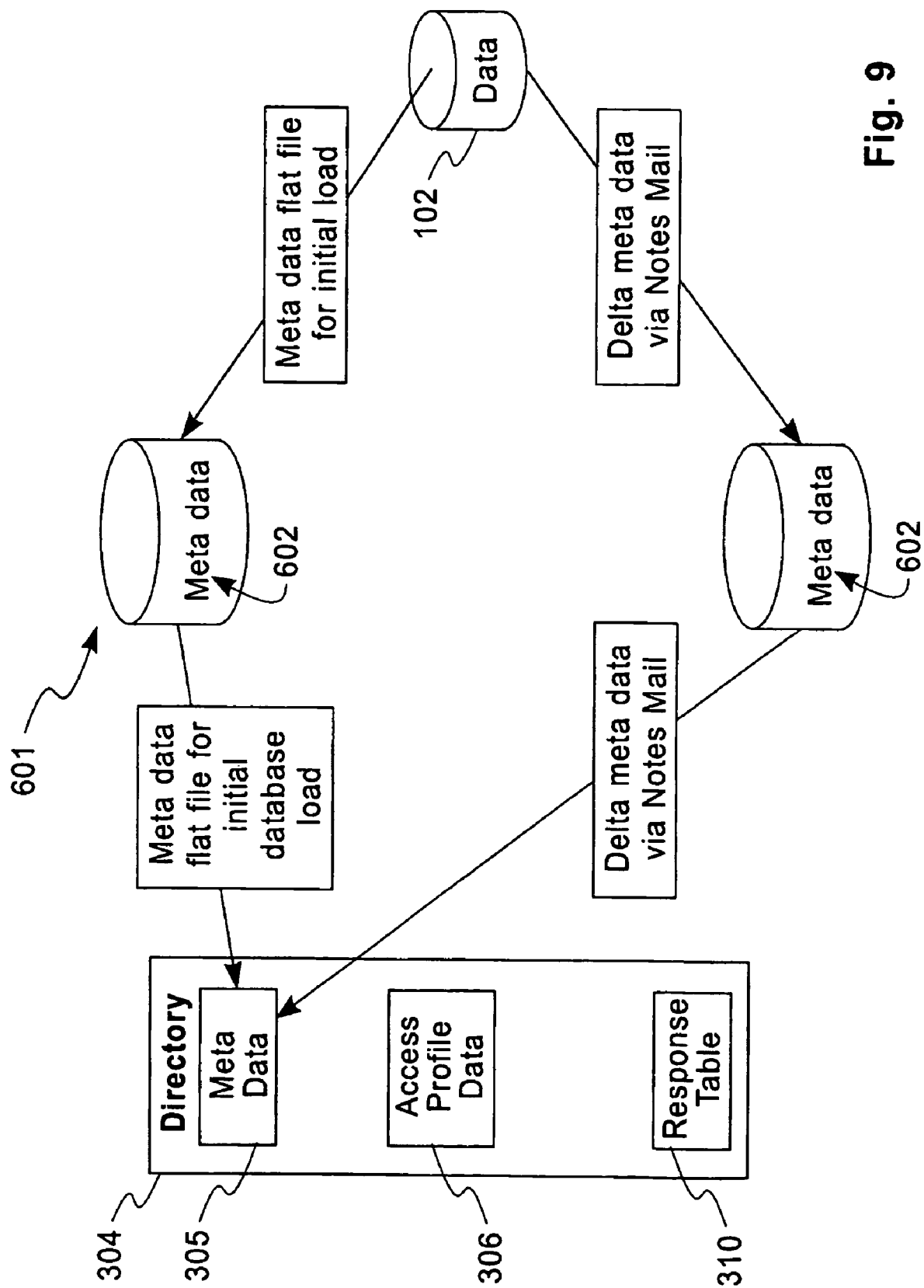
FIG. 9 illustrates the process for initially loading the meta data into the staging data base and the directory of the access control system as well as providing updates of the meta data thereto.

Finally, the process for creating and updating the repository meta data file will be considered. In order to ensure that the meta data 305 in directory 304 is kept current, it is necessary to provide periodic updates to the directory based upon changes in the data stored in the repository 102. Such changes might for example include additions, deletions or modification of existing data files, as well as the availability of previously stored data files in new formats. FIG. 9 illustrates the mechanisms for moving data from the repository 102 to the meta data table 305 in directory 304. For the initial loading of data into the directory 304, a flat file is created including a meta data representation of the data file information present in the repository. This flat file is loaded into the meta data database 602 of the Notes database 601 and thereafter forwarded to the meta data table 305 of the directory 304. Accordingly, an initial mass-loading of the meta data table 305 is affected.

In order to keep the meta data table current, periodic updates are provided from the repository to the directory 304. Accordingly, a second data flow is shown in FIG. 9 for update data whereby changes to the repository 102 are captured as so-called delta meta data and sent via Notes mail to the meta data database 602 of the Notes database 601 and thereafter forwarded to the meta data table 305 of directory 304 outside the firewall. The delta updates may be forwarded by a scheduled query that generates and mails the data as output on a predetermined basis. Additionally, it is contemplated that certain high priority change may immediately trigger such an update or alternatively, that a system administrator can manually affect such an update.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied intangible media, such as floppy diskettes, CD-ROMs, hard drives, or any other computer-readable storage medium wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described in detail above in the context of a preferred embodiment it is readily apparent to those of skill in the art that various modifications, substitutions, enhancements or the application of these principals in a different manner are all contemplated to be within the scope of the invention which may be practiced with such modifications while still falling within the scope of the appended claims.

The invention claimed is:

1. A computer-implemented method for providing access to data files stored in a data repository comprising the steps of:
   receiving a request for a data file from a requester, the request specifying a data format preference for receiving the data file, the requested data format being different than at least one of a data format used to create the data file and a data format in which the data file is stored at the time of the request;
   parsing said request into at least a metadata portion being stored in a metadata directory indicating the contents of the repository;
   receiving said request at a staging database;
   creating a flat file that includes said metadata portion;
   loading said flat file into said metadata directory;
   accessing a keyword table that is stored in the repository, said keyword table having a first level showing requested formats and a second level list which is a prioritized list of formats;
   accessing said data format preference from the first level;
   comparing said prioritized list of formats to said metadata portion of said parsed request;
   selecting a highest priority that is listed in said prioritized list of formats;
   determining if said requester is authorized to access said requested data file;
   translating the requested data file from a stored data format into said requested data format responsive to said receiving of said request from said requester, if said stored format differs from said requested format;
   making said translated data file accessible to said requester if it is determined that said requester is authorized; and
   providing periodic updates of said meta data directory, said updates reflecting changes to data in the data repository, wherein said changes to the data in the data repository are captured via delta metadata and forwarded by a schedule query that generates and mails the data to said metadata directory on at least one of a predetermined basis and an immediately triggered update based on a high priority change.

2. A method according to claim 1 wherein the repository resides behind a secure firewall, and said metadata directory resides outside of said firewall.

3. A method according to claim 1 wherein said determining step further including the step of: providing an access control element including data indicating whether a requester is to be permitted to access said requested data file.

4. A method according to claim 1 wherein said repository resides behind a secure firewall and wherein said translated data file is retained at a response repository outside of said firewall in response to said request and is accessible from said response repository by any authorized requester.

5. A method according to claim 1 wherein said repository resides behind a secure firewall, the method further comprising the steps of:
   providing an access control system outside of said firewall for receiving said request for said data file;
   determining via said access control system if the requested data file is stored in the repository; and
   passing said request to said repository if said requester is authorized and said requested data file is stored in said repository.

6. A method according to claim 5 wherein said translated data file is retained at a response repository outside of said firewall in response to said request and is accessible from said response repository by any authorized requester.

7. A method according to claim 6 wherein:
   said translating step is undertaken at said response repository; and
   said translated file retained at said response repository may be further translated based upon requests from said authorized requesters.

8. A method according to claim 7 further including the steps of:
   determining based on said received request which of said stored data formats is to be used to perform said translating into said requested file format; and
   using the results of said determination to retrieve the data file having the determined format from said repository, wherein said staging database is within said firewall.

9. A method according to claim 8 wherein said access control system includes said response repository outside of said firewall and wherein said translated data file is transferred from said staging database to said response repository outside of said firewall and retained at said response repository outside of said firewall in response to said request.

10. A method according to claim 1 further comprising the steps of:
    providing the requester with the status of the fulfillment of the request for the data file;
    providing an indication of stored formats for the requested data file; and
    storing a requester's format preferences for the requested data file.

11. A computer program product for providing access to data files stored in a data repository, the computer program product embedded on a computer-readable storage medium including executable instructions for causing a computer to implement a method, the method comprising:
    receiving a request for a data file from a requester, the request specifying a data format preference for receiving the data file, the requested data format being different than at least one of a data format used to create the data file and a data format in which the data file is stored at the time of the request;
    parsing said request into at least a metadata portion being stored in a metadata directory indicating the contents of the repository;
    receiving said request at a staging database;
    creating a flat file that includes said metadata portion;
    loading said flat file into said metadata directory;
    accessing a keyword table that is stored in the repository, said keyword table having a first level showing requested formats and a second level list which is a prioritized list of formats;
    accessing said data format preference from the first level;
    comparing said prioritized list of formats to said metadata portion of said parsed request;
    selecting a highest priority that is listed in said prioritized list of formats;
    determining if said requester is authorized to access said requested data file;
    translating the requested data file from a stored data format into said requested data format responsive to said receiving of said request from said requester, if said stored format differs from said requested format;
    making said translated data file accessible to said requester if it is determined that said requester is authorized; and
    providing periodic updates of said meta data directory, said updates reflecting changes to data in the data repository, wherein said changes to the data in the data repository are captured via delta metadata and forwarded by a schedule query that generates and mails the data to said metadata directory on at least one of a predetermined basis and an immediately triggered update based on a high priority change.

12. A computer program product according to claim 11 wherein the repository resides behind a secure firewall, and said metadata directory resides outside of said firewall.

13. A computer program product according to claim 11 wherein said determining step further including the step of: providing an access control element including data indicating whether a requester is to be permitted to access said requested data file.

14. A computer program product according to claim 11 wherein said repository resides behind a secure firewall and wherein said translated data file is retained at a response repository outside of said firewall in response to said request and is accessible from said response repository by any authorized requester.

15. A computer program product according to claim 11 wherein said repository resides behind a secure firewall, the method further comprising the steps of:
providing an access control system outside of said firewall for receiving said request for said data file;
determining via said access control system if the requested data file is stored in the repository; and
passing said request to said repository if said requester is authorized and said requested data file is stored in said repository.

16. A computer program product according to claim 15 wherein said translated data file is retained at a response repository outside of said firewall in response to said request and is accessible from said response repository by any authorized requester.

17. A computer program product according to claim 16 wherein:
said translating step is undertaken at said response repository; and
said translated file retained at said response repository may be further translated based upon requests from said authorized requesters.

18. A computer program product according to claim 17 wherein the method further comprises the steps of:
determining based on said received request which of said stored data formats is to be used to perform said translating into said requested file format; and
using the results of said determination to retrieve the data file having the determined format from said repository, wherein said staging database is within said firewall.

19. A computer program product according to claim 18 wherein said access control system includes said response repository outside of said firewall and wherein said translated data file is transferred from said staging database to said response repository outside of said firewall and retained at said response repository outside of said firewall in response to said request.

20. A computer program product according to claim 11, wherein the method further comprises the steps of:
providing the requester with the status of the fulfillment of the request for the data file;
providing an indication of stored formats for the requested data file; and
storing a requester's format preferences for the requested data file.

* * * * *